US011936122B2

(12) United States Patent
Kaufmann

(10) Patent No.: US 11,936,122 B2
(45) Date of Patent: Mar. 19, 2024

(54) COMPACT ANTENNA

(71) Applicant: u-blox AG, Thalwil (CH)

(72) Inventor: Thomas Kaufmann, Thalwil (CH)

(73) Assignee: u-blox AG, Thalwil (CH)

( * ) Notice: Subject to any disclaimer, the term of this patent is extended or adjusted under 35 U.S.C. 154(b) by 100 days.

(21) Appl. No.: 17/706,908

(22) Filed: Mar. 29, 2022

(65) Prior Publication Data

US 2022/0328967 A1 Oct. 13, 2022

(30) Foreign Application Priority Data

Apr. 13, 2021 (EP) .................................... 21168194

(51) Int. Cl.
*H01Q 9/04* (2006.01)
*H01Q 1/48* (2006.01)

(52) U.S. Cl.
CPC ............. *H01Q 9/0407* (2013.01); *H01Q 1/48* (2013.01)

(58) Field of Classification Search
CPC ............... H01Q 9/0407–0414; H01Q 1/38–48
See application file for complete search history.

(56) References Cited

U.S. PATENT DOCUMENTS

| | | | | |
|---|---|---|---|---|
| 6,133,880 | A * | 10/2000 | Grangeat | H01Q 9/045 343/700 MS |
| 6,140,968 | A | 10/2000 | Kawahata et al. | |
| 6,496,148 | B2 * | 12/2002 | Ngounou Kouam | H01Q 5/371 343/846 |

FOREIGN PATENT DOCUMENTS

| | | |
|---|---|---|
| EP | 1968159 | 9/2008 |
| JP | 2010056718 | 3/2010 |
| KR | 1020040072974 | 8/2004 |

OTHER PUBLICATIONS

EP Extended Search Report in European Appln. No. 21168194.5, dated Sep. 22, 2021, 9 pages.

* cited by examiner

*Primary Examiner* — Hasan Islam
(74) *Attorney, Agent, or Firm* — Fish & Richardson P.C.

(57) ABSTRACT

An antenna is provided comprising a substrate formed of a dielectric material. The substrate has an upper surface, a lower surface, and one or more side surfaces connecting the upper surface with the lower surface. The antenna further comprises a conductive patch on the upper surface of the substrate; a first conductive strip on one of the one or more side surfaces; and a second conductive strip on one of the one or more side surfaces. The first and second conductive strips are arranged at opposing sides of the conductive patch. The antenna further comprises a ground plane, wherein the first and second conductive strips are galvanically isolated from the conductive patch and galvanically connected to the ground plane.

15 Claims, 9 Drawing Sheets

| Name | X | Y |
|---|---|---|
| m1 | 1.1660 | -0.8447 |
| m2 | 1.1860 | -1.6511 |
| m3 | 1.1760 | -10.3608 |
| m4 | 1.5670 | -2.6384 |
| m5 | 1.5830 | -3.8300 |
| m6 | 1.5750 | -18.8484 |

COMPACT ANTENNA

CROSS-REFERENCE TO RELATED APPLICATIONS

This application claims priority to European Application No. 21168194.5, filed on Apr. 13, 2021, the contents of which are incorporated herein by reference in their entirety.

FIELD OF THE INVENTION

The present invention relates to antennas. In particular, it relates to antennas suitable for a global navigation satellite system (GNSS) receiver.

BACKGROUND OF THE INVENTION

Antennas that are suitable for a global navigation satellite system (GNSS) receiver are known. A GNSS receiver receives satellite signals transmitted from a GNSS satellite constellation through such an antenna. A next generation receiver requires operation at two frequency bands to be able to support dual-band standard precision GNSS (SPG) products. Dual-band GNSS technology is more accurate than single-band technology, reducing positioning errors caused by atmospheric distortion and multipath. It is therefore desirable to design an antenna that can be operated at two frequency bands.

SUMMARY OF THE INVENTION

The cost of the dual-band antenna is an important feature for antennas designed to be integrated into SPG products. The production of dual-band antennas can result in relatively large production costs, in comparison with antennas that support single-band SPG products. The cost may be so large that the antenna may be more expensive than the module it is to be fitted into. Therefore, it would be desirable to keep production costs low, without impacting on the functionality of the antenna.

Moreover, the size of a dual-band antenna may be larger than a single-band SPG antenna, making it harder to integrate the antenna into new dual-band SPG products. It would be desirable—for both single-band and dual-band antennas—to create a compact antenna for the purposes of miniaturization and cost reduction.

The invention is defined by the claims. According to a first aspect, there is provided an antenna comprising:

a substrate formed of a dielectric material, the substrate having an upper surface, a lower surface, and one or more side surfaces connecting the upper surface with the lower surface;

a conductive patch on the upper surface of the substrate;

a first conductive strip on one of the one or more side surfaces; and a second conductive strip on one of the one or more side surfaces, wherein the first and second conductive strips are arranged at opposing sides of the conductive patch, the antenna further comprising a ground plane, wherein the first and second conductive strips are galvanically isolated from the conductive patch and galvanically connected to the ground plane.

The upper surface may comprise or consist essentially of a planar surface. The lower surface may comprise or consist essentially of a planar surface.

The upper surface and the lower surface may be parallel to one another. In particular, the upper surface and the lower surface may lie in parallel planes.

The first and second conductive strips may be arranged so that, in use, they are capacitively coupled with the conductive patch. Thus, the first and second conductive strips provide capacitive loading for the patch. It is believed that this reduces at least one resonant frequency of the antenna, relative to the size of the antenna. Or, in other words, the same resonant frequency may be achieved with an antenna of smaller size, by virtue of the first and second conductive strips.

The ground plane may comprise a first conductive layer on or adjacent to the lower surface of the substrate. The ground plane may be parallel to the conductive patch. The first conductive layer may have the same lateral dimensions as the lower surface of the substrate.

The substrate may be attached to a base—for example, a printed circuit board (PCB). The substrate may be attached—for example, adhered—to the base at its lower surface. The ground plane may comprise a second conductive layer formed in or on the base. (This second conductive layer may be provided in addition to the first conductive layer, which is preferably formed on the lower surface of the substrate.) The ground plane may extend laterally outwardly of the substrate. For example, the second conductive layer may comprise a metal layer of a PCB, extending laterally outwardly beyond the substrate.

The second conductive layer may be circular. Alternatively, the second conductive layer may be polygonal, optionally rectangular, or optionally square (a special case of the rectangle).

The ground plane may comprise a conductive layer on the lower surface of the substrate.

The conductive layer may be the first conductive layer mentioned above.

The one or more side surfaces may each have at least a portion that is substantially perpendicular to the upper surface.

Here "substantially perpendicular" refers to an angle between the upper surface and the side surface(s) in the range 80° to 100°.

The substrate may be prism-shaped or cylindrical. In some embodiments, the substrate may comprise a right rectangular prism. That is, the upper surface and the lower surface may be rectangular, and these surfaces may be connected by four rectangular side surfaces. In some of these embodiments, the upper surface and the lower surface may be square (the square being a special case of a rectangle). In other embodiments, the substrate may comprise a right cylinder, for example, a right circular cylinder. In these embodiments, the one or more side surfaces consist of a single, continuous side surface.

The substrate is typically relatively thin. That is, the distance between the upper surface and the lower surface is typically less than the minimum dimension of the upper surface and less than the minimum dimension of the lower surface.

In any of the cases summarised above or below, the substrate may comprise chamfered or rounded edges and/or corners. If the substrate is made by moulding, this may facilitate easier release of the substrate from the mould.

The upper and lower surfaces may be square, and the one or more side surfaces may comprise four side surfaces.

The antenna may further comprise: a third conductive strip on one of the one or more side surfaces; and a fourth conductive strip on one of the one or more side surfaces, wherein the third and fourth conductive strips may be arranged at opposing sides of the conductive patch.

The conductive strips may be arranged around the one or more side surfaces such that the first and second conductive strips alternate with the third and fourth conductive strips.

For example, if the substrate has the shape of a right rectangular prism, with four side surfaces, the first and second conductive strips may be arranged on first and second opposing side surfaces, and the third and fourth conductive strips may be arranged on the third and fourth opposing side surfaces.

A similar alternating arrangement may be provided on a right cylindrical substrate, with the difference that the cylindrical substrate has a single continuous side surface and all four conductive strips are provided on this continuous side surface.

Each of the conductive strips may comprise an elongate strip portion having a longitudinal axis that is parallel to the upper surface of the substrate.

The elongate strip portion may be a rectangular strip. A longitudinal dimension of the patch may be oriented parallel to the first and second conductive strips. The elongate strip portion may have a length, along the longitudinal axis, that is equal to the length of a longitudinal edge of the conductive patch parallel to the first conductive strip. A first end of each of the first and second conductive strips may align with a first end of the longitudinal edge. A second end of each of the first and second conductive strips may align with a second end of the longitudinal edge.

In some cases, the elongate strip portion may have a length, along the longitudinal axis, that is not equal to (in particular, is less than) the length of the longitudinal edge of the conductive patch. The first end of at least one of the first and second conductive strips may align with the first end of the neighbouring longitudinal edge of the patch. The second end of at least one of the first and second conductive strips might not align with the second end of the neighbouring longitudinal edge of the patch. These features may be useful, in particular, in the context of a dual-band antenna. The difference in length may be up to 1 mm. A reduction in the length of the elongate strip portion may be used in some embodiments to increase at least one resonant frequency of the antenna. For example, in a dual-band antenna, it may increase a lower of two resonant frequencies of the antenna.

The elongate strip portion may be arranged closer to the upper surface than to the lower surface of the substrate.

Each conductive strip may further comprise a ground coupling portion below the elongate strip portion, arranged to galvanically connect the elongate strip portion to the ground plane.

The ground coupling portion may have a rectangular shape, with its longitudinal axis parallel to the upper surface of the substrate.

The ground coupling portion may be offset horizontally from a centre of the elongate strip portion.

In this way, the conductive strip may be provided with an uneven T-shape, or with an inverted L-shape.

In some other embodiments, the elongate strip portion has a lower edge in contact with the ground plane. This is an alternative to arranging a ground coupling portion below the elongate strip portion. Instead, it puts the elongate strip portion in direct contact with the ground plane.

The conductive patch may be shaped such that its convex hull describes one of: a circle; an ellipse; a rectangle; a rectangle having four corners, wherein at least one of the corners is truncated; a rectangle having four corners, wherein two diagonally opposing corners are truncated; and a rectangle having four corners, wherein all four corners are truncated.

Here, it should be understood that each “rectangle” includes the option of a square, as a special case in which the rectangle has sides of equal length. Alternatively, the rectangle may have sides of unequal length.

The convex hull is the smallest convex shape that contains the patch.

The truncation of a corner shortens the sides of the rectangle that are adjacent to the corner. The truncation of the corners is preferably shallow. This means that each edge created by the truncation is shorter than the remaining length of all of the shortened sides.

One or more of the truncated corners may comprise an edge created by the truncation that lies at an angle of 45° to each of the adjacent edges of the rectangle.

Equivalently, at the or each truncated corner, the patch may be described as deviating from a rectangular outline by the absence of an isosceles triangle, wherein the base of the isosceles triangle describes the edge created by the truncation.

The conductive patch may be described as having one of the following shapes: a circle; an ellipse; a rectangle; a rectangle having four corners, wherein at least one corner is truncated; a rectangle having four corners, wherein two diagonally opposing corners are truncated; and a rectangle having four corners, wherein the four corners are truncated.

The conductive patch may include one or more concave features present along one or more edges of the convex hull, the one or more concave features including: a stepped indentation in a transverse edge of the conductive patch, the stepped indentation comprising a step of up to 1 mm in the transverse edge; a first slot in a longitudinal edge of the conductive patch, the first slot having a length of up to 2 mm and a width in the range 0.1 to 0.5 mm; and a second slot in a transverse edge of the conductive patch, the second slot having a length of up to 3 mm and a width in the range 0.1 to 0.5 mm.

At least one of the first and second slots may be rectangular. The longitudinal edge of the patch may be an edge parallel to the longitudinal (length) dimension of the patch. The transverse edge of the patch may be an edge parallel to the transverse (width) dimension of the patch. The transverse edge may be perpendicular to the longitudinal edge.

The stepped indentation may terminate in a truncated corner of the patch. The stepped indentation may comprise a step, the step being aligned with a centre line of the substrate.

The conductive patch may occupy at least 95% of the area of its convex hull. The conductive patch may deviate from its convex hull by the presence of concave features in one or more of its edges. Such concave features may be used to tune the frequency characteristics of the antenna—in particular, to correct for process variations in the fabrication of the antenna.

The presence of concave features can decrease or increase at least one resonant frequency of the antenna. In the case of dual-band antennas, the presence of more than one concave feature can decrease or increase a first and second resonant frequency. The stepped indentation may be used to increase the higher of two resonant frequencies of the antenna. The first slot may be used to decrease this higher resonant frequency. The second slot may be used to decrease the lower of two resonant frequencies of the antenna. Typically, the antenna will not have both the stepped indentation and the first slot. Likewise, the antenna will typically not have both the second slot and an elongate strip portion of at least one conductive strip that is shorter in length along the neighbouring longitudinal edge than the conductive patch.

The concave features summarised above may be configured to achieve a downshift of up to 25 MHz in at least one resonant frequency. The concave features summarised above may be configured to achieve an upshift of up to 30 MHz or up to 25 MHz upshift in at least one resonant frequency. The addition of one concave feature may tune one resonant frequency independently of the other such that only one resonant frequency is affected per concave feature.

The conductive patch may have a feed point. The feed point may be offset from a centre of the conductive patch and/or offset from a centre of the upper surface of the substrate.

The conductive patch may have a longitudinal centreline, and a transverse centreline that is perpendicular to the longitudinal centreline. The centre of the patch may be defined as the intersection of its longitudinal and transverse centrelines.

Alternatively, or in addition, the centre may be defined as the centroid of the patch.

The feed point may be offset from the centre of the patch in both longitudinal and the transverse directions.

The feed point may comprise a pin extending from the conductive patch through the substrate. Alternatively, the feed-point may comprise a through-hole through the substrate, the through-hole having a side-wall that is lined with conductive material.

The centre of the substrate may be defined in the same way as for the centre of the conductive patch.

The upper surface of the substrate may be square. The feed point may be offset from the centre, along one centreline of the square.

The centre of the conductive patch may be offset from the centre of the upper surface of the substrate. In particular, the conductive patch may be offset such that it is closer to the first conductive strip than it is to the second conductive strip.

The antenna may have a certain configuration, wherein: the substrate comprises a right rectangular prism; the upper and lower surfaces of the substrate are square; the conductive patch is shaped such that its convex hull describes a rectangle having four corners, wherein two diagonally opposing corners are truncated; the first conductive strip has an upper edge parallel to the upper surface of the prism; and the conductive patch has a longitudinal edge parallel to the first conductive strip.

The upper edge of the first conductive strip and the longitudinal edge of the conductive patch may be coextensive, or may differ as summarised previously above. By coextensive it is meant that the edges begin and end in line with one another. The upper edge and the longitudinal edge start in a first common plane and end in a second common plane. The first and second common planes are perpendicular to the extension of the upper edge and the longitudinal edge (which are parallel to one another).

The dielectric material may have a dielectric constant (relative permittivity) in the range 30 to 70, optionally 50 to 70, or 55 to 65. The dielectric material may comprise or consist of a ceramic material. In particular, the substrate may be moulded from the ceramic material.

The antenna may be a dual-band antenna that has a first resonant frequency in a lower frequency band and a second resonant frequency in a higher frequency band. The antenna may be a dual-band antenna, configured to receive signals from GPS satellites, which has a first resonant frequency in the L5 band and a second resonant frequency in the L1 band. The antenna may be a dual-band antenna, receiving signals from Galileo satellites, having a first resonant frequency in the E5a band and a second resonant frequency in the E1 band. The antenna may be a dual-band antenna, receiving signals from BeiDou navigation satellite system (BDS) satellites, having a first resonant frequency in the B2a band and a second resonant frequency in the B1C band.

To have a first resonant frequency in the lower frequency band and a second resonant frequency in the higher frequency band, the antenna may have the following dimensions. The substrate may have a length and a width in the range 12 to 20 mm, with the length and the width optionally being equal, and a height (between the upper and lower surfaces) in the range 3 to 8 mm. The conductive patch may have a length, width, or diameter in the range 11 to 19 mm. The conductive patch may be shifted from the centre of the substrate by up to 1 mm. If the conductive patch has one or more truncated corners, a truncated edge may have a length in the range 0.7 to 2.9 mm. The feed may be placed 0.25 to 3 mm away from the substrate centre. The first and second conductive strips may each consist of an elongate strip portion and a ground coupling portion. The ground coupling portion may have a length in the range 2 to 10 mm and a width in the range 1 to 5 mm, whilst the elongate strip portion may have a length in the range 9 to 18.5 mm and a width in the range 1 to 6 mm. The dimensions of the first and second conductive strips are less than or equal to the dimensions of the one or more side surfaces of the substrate; each of the first and second conductive strips is configured to fit on one of the one or more side surfaces.

According to another aspect, there is provided a GNSS receiver module, comprising:

an antenna as summarized above; and a GNSS receiver, coupled to the antenna.

The antenna may be coupled to the GNSS receiver via one or more filters and/or amplifiers.

The GNSS receiver may be configured to receive signals in both the L1 and L5 GPS bands, via the antenna. The GNSS receiver may be configured to receive signals in both the E1 and E5a Galileo frequency bands, and/or in both the B1C and B2a BeiDou frequency bands, via the antenna.

BRIEF DESCRIPTION OF THE DRAWINGS

The invention will now be described by way of example with reference to the accompanying drawings, in which:

FIG. 4A illustrates concave features in the conductive patch, while FIG. 4B illustrates an adjustment made to one of the conductive strips;

FIG. 5A illustrates the case in which the higher of two resonant frequencies is decreased, FIG. 5B illustrates the case in which the higher of two resonant frequencies is increased, FIG. 5C illustrates the case in which the lower of two resonant frequencies is decreased, and FIG. 5D illustrates the case in which the lower of two resonant frequencies is increased;

Figure 1:
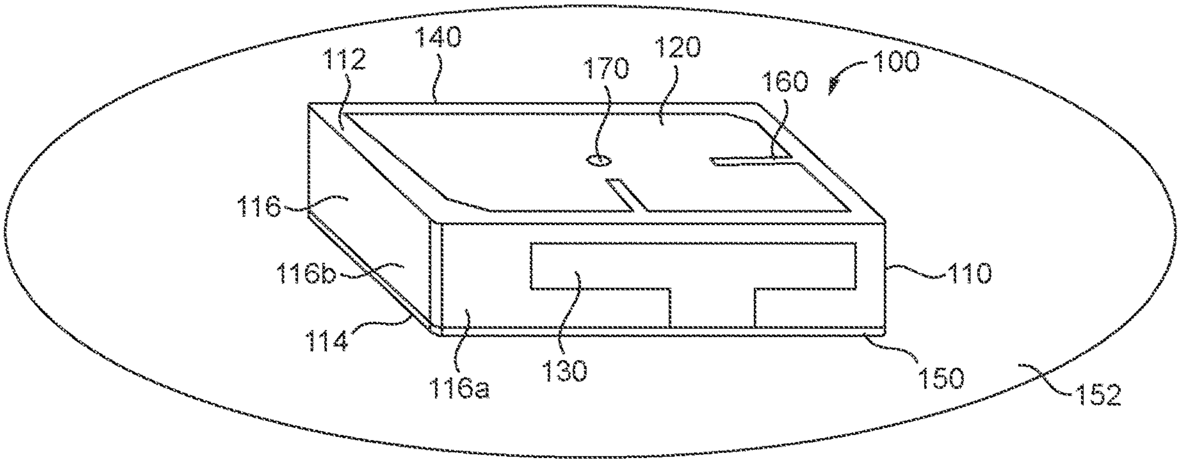
FIG. 1 is a diagram of an antenna according to an example, including features configured to tune the antenna.

It should be noted that these figures are diagrammatic and not drawn to scale. Relative dimensions and proportions of parts of these figures have been shown exaggerated or reduced in size, for the sake of clarity and convenience in the drawings.

DETAILED DESCRIPTION

Reference will now be made in detail to embodiments of the invention, examples of which are illustrated in the accompanying drawings. The described embodiments should not be construed as being limited to the descriptions given in this section; the embodiments may have different forms.

FIG. 1 shows a diagram of an antenna 100 according to a first embodiment. The antenna in this example is used as part of a GNSS receiver module 300, but the scope of the present disclosure is not limited to such an embodiment. The antenna in this example is a dual-band antenna configured to receive signals from GPS satellites, with a first resonant frequency in the L5 band and a second resonant frequency in the L1 band. However, the antenna is not limited to such an example, and could be designed to receive signals from other GNSS constellations.

As shown in FIG. 1, the antenna comprises: a substrate 110 formed of a dielectric material, a conductive patch 120, a first conductive strip 130, a second conductive strip 140 (out of view in the perspective drawing of FIG. 1), and a ground plane 150, 152. The substrate 110 has an upper surface 112, a lower surface 114, and one or more side surfaces 116 that connect the upper surface with the lower surface. As shown in FIG. 1, the substrate has four side surfaces 116, each of the side surfaces being perpendicular to the upper and lower surfaces of the substrate. In FIG. 1, there are four side surfaces: a first side surface **116*a*, a second side surface 116*b* perpendicular to the first side surface, a third side surface parallel to the first side surface, and a fourth side surface parallel to the second side surface (the third and fourth side surfaces are not visible in FIG. 1**). The upper and lower surfaces of the substrate have matching length and width dimensions, and are parallel to one another. The length of the upper and lower surfaces is equal to the width of the upper and lower surfaces, such that the basic shape of the substrate is a right square prism. As used herein, the term “prism” refers to a polyhedron with a first n-sided polygonal base and a second base which is a translated copy of the first base without rotation. A right prism is a prism in which the joining edges and faces are perpendicular to the base faces. Any cross-section of the prism is also a translated copy of the first base without rotation.

The height of the substrate is much less than the width and length dimensions of the upper and lower surfaces, for miniaturisation purposes (among other reasons). Although not shown in the schematic drawing of FIG. 1, the corners and edges of the substrate are rounded, a by-product originating from the manufacturing process. The rounded edges and corners of the substrate facilitate easy release of the substrate from a mould, simplifying the production method of the antenna. The substrate of the claimed antenna is made of a dielectric material with a high dielectric constant (relative permittivity), $\varepsilon_r \cong 60$. The substrate in FIG. 1 has dimensions 15×15×4 mm; the antenna is able to have a substrate this compact partially as a result of the high dielectric constant of the material.

The conductive patch 120 is attached to the upper surface of the substrate. The conductive patch is made of a metallic foil. The conductive patch has a longitudinal (length) edge that is parallel to an upper edge of the first conductive strip 130 and a transverse (width) edge that is perpendicular to the longitudinal edge. As shown in FIG. 1 (and more precisely in the plan view of FIG. 2), the convex hull of the conductive patch (the smallest convex shape that contains the conductive patch) is rectangular with two truncated edges at diagonally-opposing corners. The convex hull has dimensions smaller than the upper surface of the substrate. The length of the truncated edges is considerably shorter than the length of a longitudinal or a transverse edge of the conductive patch. The truncated edges each have a 135° interior angle with the longitudinal edge and the transverse edge of the conductive patch. The convex hull of the conductive patch has a length, Lpatch, of 12.68 mm and a width, Wpatch, of 12.25 mm, while the two truncated corners have truncated edges 2.12 mm long. The length of each truncated edge is the hypotenuse of a right-angled isosceles triangle. The other sides of this isosceles triangle have a length Ltruncated.

Concave features 160 may be present along any of three of the edges of the convex hull, for tuning. These will be described in greater detail below, with particular reference to FIG. 4A-FIG. 4B.

Figure 2:
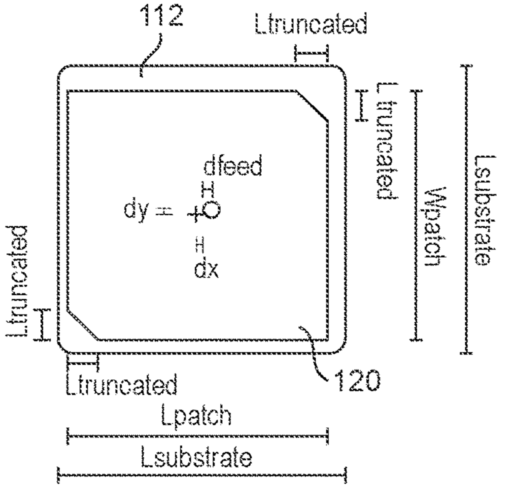
FIG. 2 is a plan view of the antenna of FIG. 1, illustrating a configuration of the conductive patch, but without showing the features configured to tune the antenna.

The conductive patch is offset such that the centre of the conductive patch is not aligned with the centre of the upper surface of the substrate. FIG. 2 is a top plan view of the antenna. As shown in FIG. 2, the convex hull of the conductive patch, and hence the conductive patch itself, is shifted from the centre of the upper surface of the substrate by a length dx and a width dy. In this embodiment, the centre of the conductive patch deviates from the centre of the upper surface of the substrate by a length dx=0.25 mm, and a width dy=0.27 mm. (Here, “length” is used to denote a dimension that is parallel to the longitudinal dimension of the conductive patch; “width” is used to denote a dimension that is parallel to the transverse dimension of the conductive patch.) The centre of the upper surface of the substrate is defined as the centroid of the upper surface of the substrate. The centre of the conductive patch is defined as the intersection of its longitudinal centreline and its transverse centreline. The centre of the conductive patch is labelled with the crosshair symbol ‘+’ in FIG. 2.

In the example shown in FIG. 1, the substrate 110 is mounted on a base—in particular, a printed circuit board (PCB). The PCB itself is not shown in the drawing. The ground plane comprises a first conductive layer 150, formed on the lower surface of the substrate, and a second conductive layer 152 formed on an upper surface of the PCB. Each of these conductive layers is made of a metallic foil, and is parallel to the conductive patch on the upper surface of the substrate. The first conductive layer 150 in this embodiment has the same length and width dimensions (Lfirstlayer) as the lower surface of the substrate (Lsubstrate). It is formed on the entire lower surface of the substrate. The second conductive layer in this embodiment is circular and has a diameter (Dsecondlayer) of 100 mm. The circular shape of the second conductive layer helps to achieve an omnidirectional radiation pattern in the horizontal plane. The centre (centroid) of the first conductive layer is directly above the centre (centroid) of the second conductive layer. The shape of the ground plane and the centering of the antenna over the ground plane may affect performance and the symmetry of the radiation pattern. The first and second conductive layers are galvanically connected. For example, they may be connected to one another (electrically and mechanically) either by solder or by a conductive adhesive tape.

The provision of the first conductive layer 150 on the lower surface of the substrate 110 ensures that the antenna has a well-defined height. The height is measured vertically from the conductive patch 120 to the first conductive layer. This height is determined by the thickness of the substrate. It is well-defined, and it can be controlled during the manufacture of the substrate. If the first conductive layer 150 were to be omitted, such that the ground plane was provided solely by the second conductive layer 152, then there is a risk of greater variability in the height of the antenna. The height of the antenna would then include the height of any component used to attach the substrate to the PCB. Thus, for example, it might depend on the thickness of an adhesive tape used to fix the substrate 110 to the PCB. Deviation from the specified antenna height may lead to performance degradation.

Meanwhile, the large ground plane (in particular, the large second conductive layer), relative to the size of the antenna, is desirable in order for the antenna to exhibit its intended resonant frequencies and other performance characteristics. In another example, the second conductive layer may have a diameter smaller than 100 mm, potentially as small as 45 mm. The smaller diameter allows the antenna to be more compact, at the expense of antenna performance. The reduction in the ground plane diameter may lead to a slight shift in the resonant frequencies, which may have to be corrected, or tuned, for the antenna to perform as intended. If the diameter of the ground plane is less than 45 mm, the antenna may experience significant performance degradation.

Both the size of the conductive patch and the dielectric constant of the substrate affect the resonant frequencies of the antenna. By choosing a substrate with a higher dielectric constant, the size of the patch can be reduced, and hence a more compact antenna can be produced, while the antenna still has the desired resonant frequencies in the L5 and L1 frequency bands.

The conductive patch as shown in FIG. 1 has a feed point 170 close to the centre of the conductive patch. As shown in FIG. 2, the feed point of the antenna is longitudinally offset from the centre (centroid) of the upper surface of the substrate by a length 'dfeed', but is aligned with the centre of the upper surface of the substrate in the transverse direction. In this embodiment, the deviation, dfeed, from the centroid is 0.5 mm. This placement of the feed point is determined by the electromagnetic field distribution in the conductive patch. The feed point is positioned so that the antenna excites the resonances at the correct resonant frequencies, and so that the antenna matches the impedance of a transmission line used to feed it. For example, the impedance of the transmission line may be 50 Ohms (the standard impedance for radio-frequency (RF) systems). As the conductive patch has been offset from the centre of the upper surface of the substrate by a length dy and a width dx, the feed point is not in the centre of the conductive patch. The feed point is off-centre to allow two frequency modes to be excited independently. The feed point is offset along the longitudinal axis for the lower resonant frequency mode (L5), and is offset along the transverse axis (perpendicular to the longitudinal axis) for the higher resonant frequency mode (L1). The feed point comprises a through-hole through the substrate, the side-wall of the through-hole being lined with a conductive material. This conductive lining of the through-hole is galvanically connected to the conductive patch. The feed point is connected to a receiver.

Figure 3:
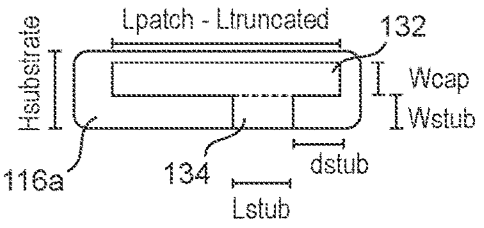
FIG. 3 is a side view of the antenna of FIG. 1, illustrating a configuration of one of the conductive strips, but without showing the features configured to tune the antenna.

In FIG. 3, a side view of the antenna is illustrated (directly facing the first side surface **116*a* of the substrate), detailing the first conductive strip 130. The first conductive strip is arranged on the first side surface 116*a* of the substrate, parallel and opposite to the position of the second conductive strip 140, labelled (but out of sight) in FIG. 1 on the third side surface. Hence, the first and second conductive strips are attached to planes perpendicular to the conductive patch and the ground plane. In the present example, both the first and the second conductive strip are made of the same conductive material used for the conductive patch and the ground plane. The initial dimensions of the first and second conductive strip are identical (before tuning), and so only the dimensions of the first conductive strip are described. The first conductive strip can be described conceptually as consisting of two parts: an elongate strip portion 132 and a ground coupling portion 134 below the elongate strip portion. The elongate strip portion 132 extends horizontally along the first side surface 116*a*. The ground coupling portion extends from a lower edge of the elongate strip portion to a lower edge of the first side surface. It galvanically connects the elongate strip portion to the ground plane. In FIG. 3, the boundary between the two parts is identified by a dashed line, for the purposes of explanation; however, in practice, the entire first conductive strip will usually be formed as one unitary piece of conductive material. Both the elongate strip portion and the ground coupling portion are rectangular in shape. In this particular embodiment, the ground coupling portion has a length, Lstub, of 2.21 mm and a width (that is, height), Wstub, of 1.59 mm, while the elongate strip portion has a length (Lpatch—Ltruncated) of 11.18 mm and a width (height), Wcap, of 1.52 mm. The elongate strip portion has a length that is (at least initially) formed so as to have the same length as the longitudinal edge of the conductive patch, defined as the length of the conductive patch (12.68 mm) minus the longitudinal length of the truncated edge (1.5 mm). The upper edge of the first conductive strip and the longitudinal edge of the conductive patch may initially be formed so that they are coextensive, meaning that their ends are aligned in two parallel vertical planes perpendicular to the first side surface bearing the conductive strip. The height of the substrate (4 mm) is larger than the largest width (height) of the first conductive strip (3.11 mm—the combined height of the elongate strip portion and the ground coupling portion), such that the first conductive strip has a small gap between the upper edge of the first conductive strip and the longitudinal edge of the upper surface of the substrate. This ensures that the first conductive strip is not galvanically connected to the conductive patch. As shown in FIG. 3**, the first conductive strip forms an asymmetric T-shape, such that the centre (centroid) of the elongate strip portion is not directly above the centre (centroid) of the ground coupling portion. In this example, the ground coupling portion is offset to the right of the centre of the elongate strip portion. In this embodiment, a right-hand vertical edge of the ground coupling portion is displaced from a right-hand vertical edge of the elongate strip portion by a length, 'dstub', of 3.6 mm. The initial dimensions of the second conductive strip are the same as the initial dimensions of the first conductive strip (prior to tuning).

The first and second conductive strips are arranged so that they are capacitively coupled with the conductive patch, to provide capacitive loading for the conductive patch on the opposing side surfaces of the antenna. By designing the antenna with a first and a second conductive strip, the size of the antenna can decrease (for a given desired operating frequency). In particular, in this example, the addition of the first and second conductive strips allows the compact antenna with the specified dimensions to operate at the L1 (1575.42 MHz) and L5 (1176.45 MHz) frequency bands. The first and second conductive strips are configured such that at least one resonant frequency of the antenna is reduced relative to the size of the antenna. In this embodiment, the first and second conductive strips are present in order to lower the resonant frequency for the L5 band. Hence, the first and second conductive strips allow the antenna to achieve dual-band functionality, whilst the antenna itself remains compact.

While the foregoing description has focused on the shapes of the various parts of the antenna when they are initially fabricated, it should be noted that tuning-adjustments might need to be made to these basic shapes, in order to tune each individual antenna. Process variations during the preparation of the dielectric material, and during the fabrication of the antenna, can cause changes in the frequency response of the antenna. In particular, this may affect its resonant frequencies. All of the dimensions of the patch, the first and second conductive strip, and the position of the feed are mutually dependent; a change to one of these variables may affect the behaviour of the antenna. Each individual antenna produced can be tuned, to adjust the resonant frequencies towards their nominal, desired values. This may be done at the end of the production process of the antenna. In order to tune the antenna correctly, the manufactured antenna is measured to see what tuning-adjustments are required. The tuning may be an iterative process, performed by removing portions of the conductive parts that were initially laid out as described above (with reference to FIG. 2 and FIG. 3). In this iterative process, the antenna may be measured and adjusted multiple times, until the resonant frequencies have been adjusted towards their nominal, desired values. The tuning-adjustments made to the shape of the antenna parts will now be explained with reference to FIG. 4A-FIG. 4B.

Figure 4A:
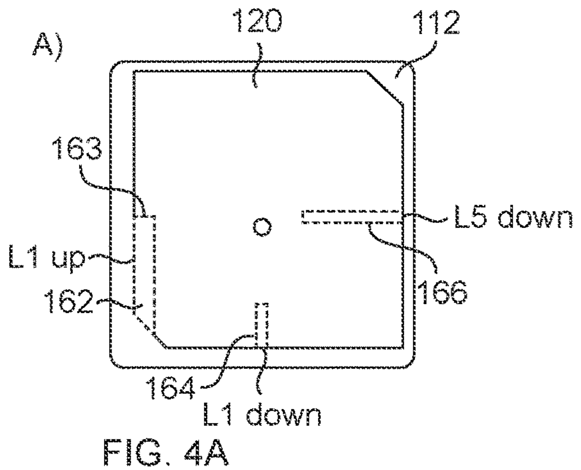
FIG. 4A and FIG. 4B illustrate the features configured to tune the antenna of FIG. 1.
Figure 4B:
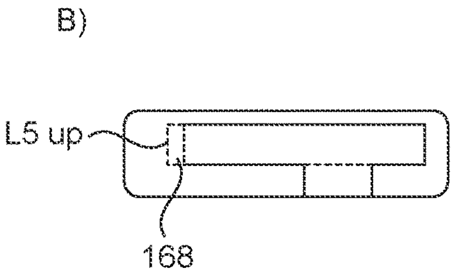

FIG. 4A-FIG. 4B illustrate a conductive patch and one of the first and second conductive strips that have been tuned to bring the resonant frequencies closer to their nominal target values. In FIG. 4A, three possible concave features 162, 164, 166 are illustrated by dashed lines. Each concave feature is present along one or two edges of the convex hull. The plan-view shape of the conductive patch deviates from its convex hull by the presence of the concave features. The conductive patch covers at least 95% of the area of its convex hull. In FIG. 4B, an adjustment 168 is made to either the first conductive strip or the second conductive strip after the strip has been formed, so that upper edge of one of this conductive strip is no longer coextensive with the adjacent longitudinal edge of the conductive patch.

A stepped indentation 162, is illustrated along the transverse edge of the conductive patch in FIG. 4A. This stepped indentation 162 can be created by removing part of the metal foil of the conductive patch 120. This may be done manually, or may be automated by laser cutting. The initial step 163 of the stepped indentation occurs along the longitudinal centre line through the centre of the upper surface of the substrate. The stepped indentation continues until it terminates in the truncated corner of the conductive patch. In this embodiment, the initial step of the stepped indentation is up to 1 mm. A transverse edge created by the stepped indentation is substantially parallel to each transverse end edge of the conductive patch. In other words, the stepped indentation is created by removing a substantially trapezoidal shape along the transverse edge of the conductive patch.

A first slot 164 is illustrated in the longitudinal edge of the conductive patch, and a second slot 166 is illustrated in the transverse edge of the conductive patch. The first slot has a length of up to 2 mm and a width of up to 0.5 mm, while the second slot has a length of up to 3 mm and a width of up to 0.5 mm. Each of the slots has parallel sides, and substantially uniform width, so that each slot is substantially rectangular.

The adjustment 168 made to either the first conductive strip or the second conductive strip is illustrated in FIG. 4B and is described below. A rectangular portion (shown in dashed outline in FIG. 4B) is removed from the left-hand end of the elongate strip portion of the conductive strip. As a result of the removal of this portion, although a first end of the conductive strip still aligns with a first end of the longitudinal edge of the conductive patch, a second end of the conductive strip does not align with a second end of the longitudinal edge of the conductive patch. In this embodiment, the conductive strip in question is shorter than the adjacent longitudinal edge of the conductive patch by up to 1 mm. Note that, in FIG. 4B, as in FIG. 3, the boundary between the two parts of the conductive strip (that is, the elongate strip portion and the ground coupling portion) is again identified by a horizontal dashed line.

Each of the tuning-adjustments described above is able to tune one of the resonant frequencies of the antenna. It should be understood that it is not meaningful to give precise dimensions for any of the tuning-adjustments, for any given example, because the necessary dimensions will depend on the particular characteristics of each individual manufactured antenna. In an ideal, theoretical example, if the antenna could be manufactured exactly to specification, with a sufficiently large ground plane and with a housing placed sufficiently far away from the antenna to avoid any undesired offset of the resonant frequencies, there would be no need for the tuning-adjustments. The tuning-adjustments are used to correct for deviations from the ideal characteristics. The tuning-adjustments may be applied incrementally, in an iterative fashion, until the characteristics of the antenna have been brought close enough to their target values.

The presence of the stepped indentation 162 increases the higher resonant frequency (L1) of the two resonant frequencies of the antenna. The presence of the adjustment 168 on (at least) one of the first and second conductive strips increases the lower of the two resonant frequencies (L5). The inclusion of either of these features to the antenna can achieve an upshift of up to 30 MHz in the respective frequency band. The presence of the first slot 164 in the longitudinal edge of the conductive patch decreases the higher of the two resonant frequencies (L1). The presence of the second slot 166, in the transverse edge of the conductive patch, decreases the lower of the two resonant frequencies (L5). The inclusion of either of these features can achieve a downshift of up to 25 MHz in the respective frequency band.

Only certain combinations of the tuning features will usually be implemented together, to tune the antenna correctly. For example, it would typically not make sense to have an antenna with both the stepped indentation 162 and the first slot 164. Only one of these concave features is required to tune the higher of the two resonant frequencies of the antenna. One increases the higher resonant frequency (L1), and the other decreases it. Similarly, it would not usually make sense to have the adjustment 168 on the first or second conductive strip as well as the second slot 166. Only one of these two features is required to tune the lower of the two resonant frequencies of the antenna. One increases the lower resonant frequency (L5), and the other decreases it. In FIG. 1, an example is shown of an appropriate combination of concave features present in order to tune the antenna: the first slot is provided in the longitudinal edge of the conductive patch to decrease the higher resonant frequency (L1), and the second slot is provided in the transverse edge of the conductive patch to decrease the lower resonant frequency (L5).

Figure 5A:
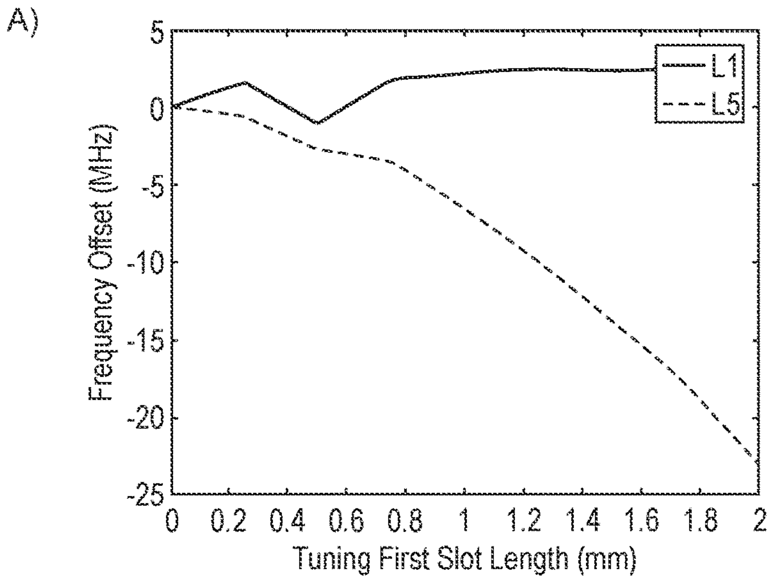
FIG. 5A-FIG. 5D are a series of graphs illustrating how to tune the resonant frequencies of the antenna of FIG. 1.
Figure 5B:
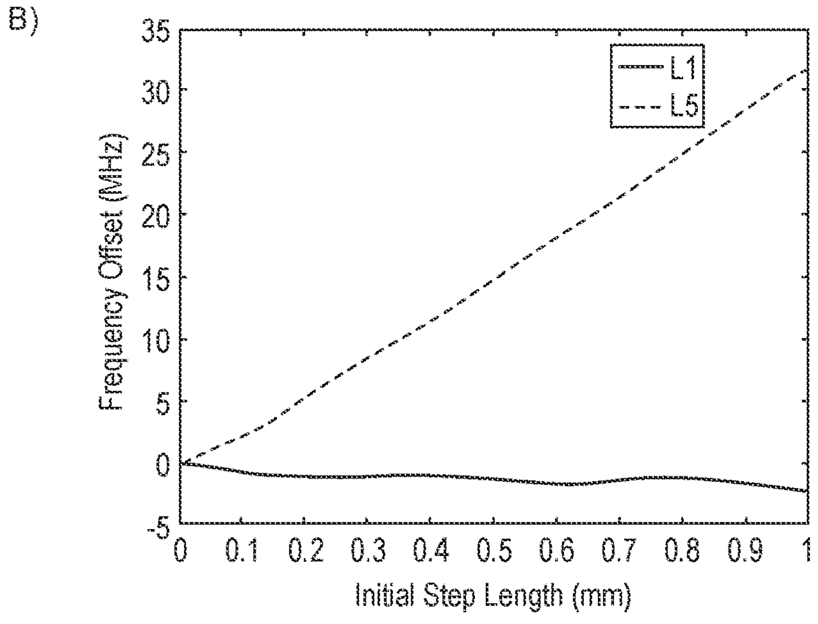
Figure 5C:
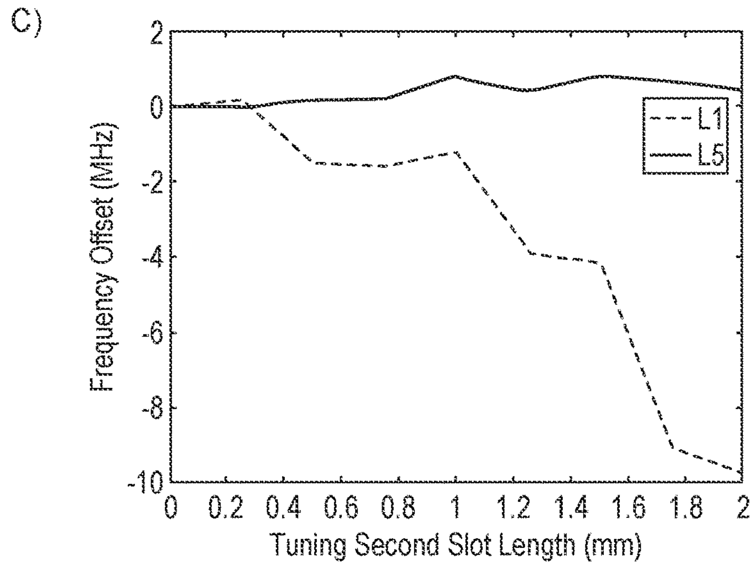
Figure 5D:
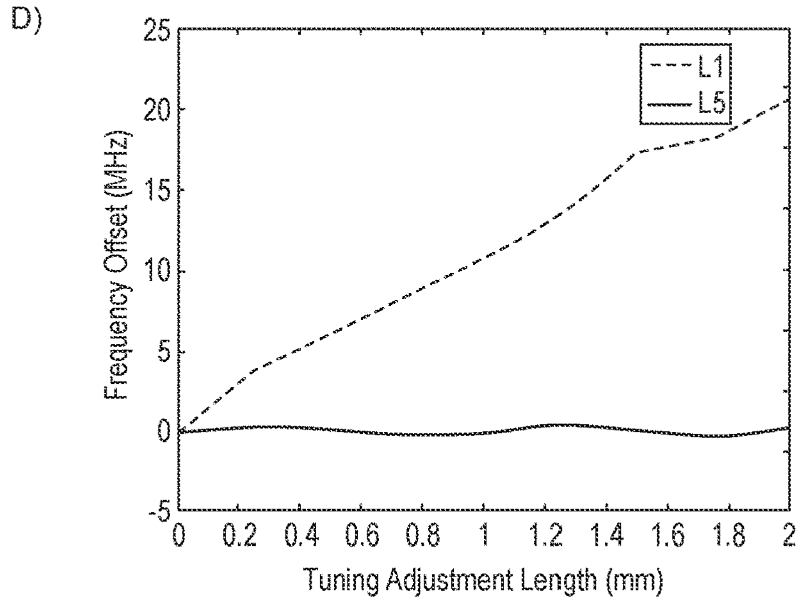

FIG. 5A-FIG. 5D illustrate the relationships between the dimensions of the concave features 162, 164, 166 and adjustment 168 and the change in the resonant frequencies. In FIG. 5A, the first slot 164 is the only tuning feature on the antenna. In the figure, as the length of the first slot increases, the higher resonant frequency (L1) reduces approximately linearly. At a first slot length of 2 mm, the higher resonant frequency decreases by just under 25 MHz. In FIG. 5B, the stepped indentation 162 is the only tuning feature. As the indentation increases up to a step of 1 mm, the higher resonant frequency (L1) increases approximately linearly. For a stepped indentation of 1 mm, the higher resonant frequency increases by just under 35 MHz. In FIG. 5C, the second slot 166 is the only tuning feature. As the length of the second slot increases, the lower resonant frequency (L5) decreases. At a second slot length of 2 mm, the lower resonant frequency decreases by just under 10 MHz. In FIG. 5D, the first conductive strip has the rectangular portion removed by the adjustment 168, while no other tuning features are present on the antenna. As the length of the conductive strip decreases (that is, as the size of the removed rectangular portion increases), the lower resonant frequency (L5) increases approximately linearly. With removal of 1 mm of the length of the conductive strip, the lower resonant frequency increases by just over 10 MHz. Note that, in each of FIGS. 5A-D, the other resonant frequency not being tuned did not experience a significant change in frequency. The figures demonstrate that the implementation of one feature to tune one resonant frequency can tune that resonant frequency independently of the other resonant frequency. The independence of the tuning features allows for a quicker, easier tuning process. This can avoid the need, for example, to alternate repeatedly between adjusting one resonant frequency and then the other (which might be necessary if each tuning-adjustment affected both resonant frequencies).

Figure 6:
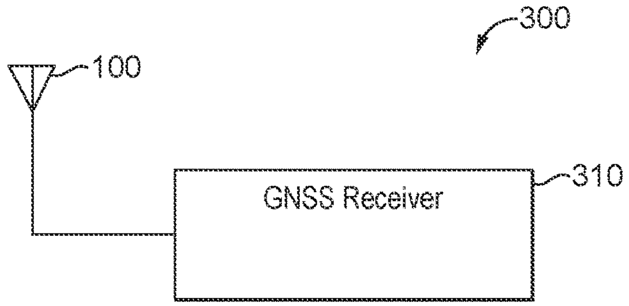
FIG. 6 is a schematic block diagram of a GNSS receiver module according to an example.

In FIG. 6, an example of a GNSS receiver module 300 is illustrated. The dual-band antenna 100 described above forms one part of the GNSS receiver module, with the antenna being coupled to a GNSS receiver 310. As a result of the design of the antenna, the GNSS receiver 310 is able to operate at two frequency bands. In this embodiment, the receiver can operate at the L1 and L5 frequency bands having received signals from GPS satellites through the antenna. The GNSS signal received by the antenna may be transmitted to the GNSS receiver via a coaxial RF cable or any other cable or waveguide suitable for conveying an RF signal.

Figure 7:
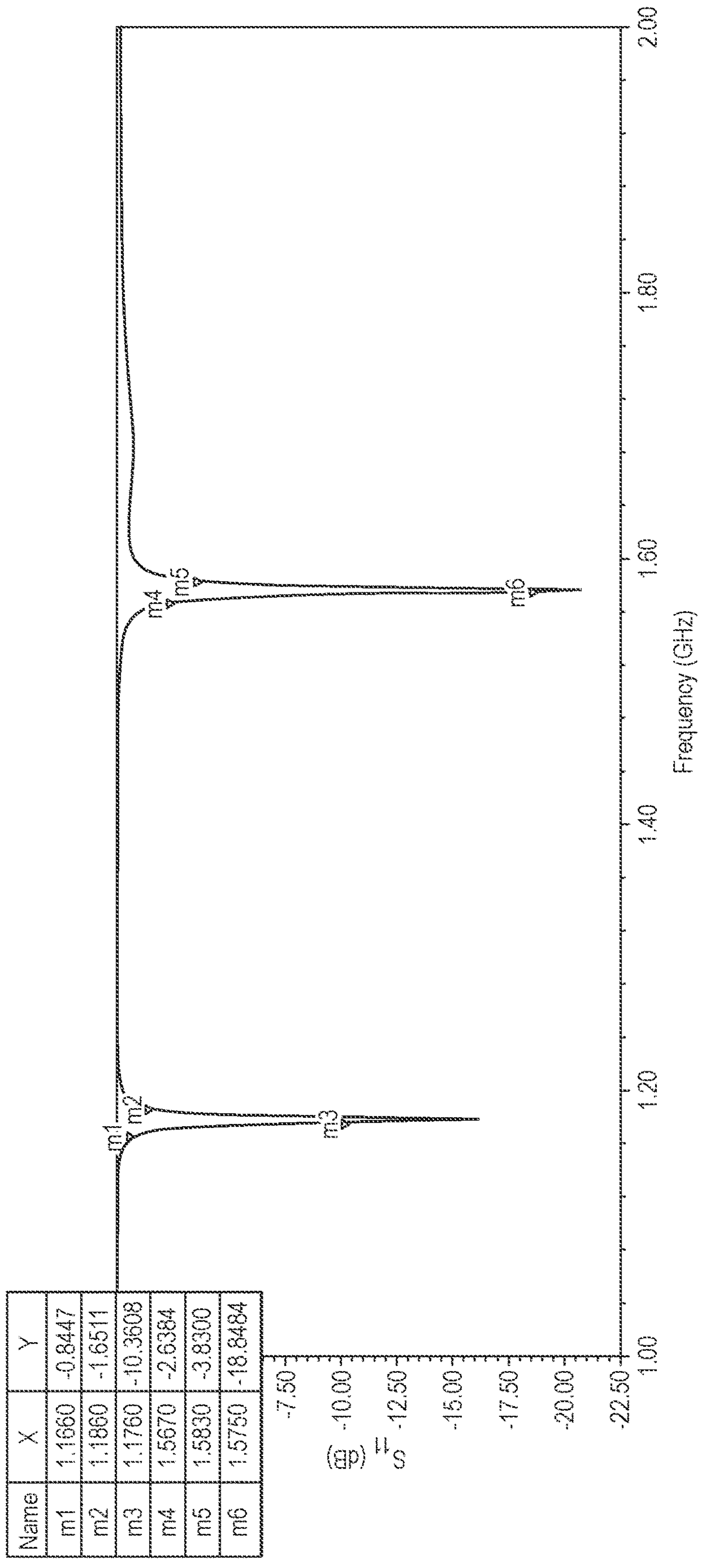
FIG. 7 is a graph illustrating the $S_{11}$ parameter values of the antenna of FIG. 1.

FIG. 7 illustrates how an S-parameter varies over a range of frequencies that encompass the L1 and L5 frequency bands. The parameter $S_{11}$ describes how much power is reflected from the antenna. At $S_{11}=0$ dB, all the power input to the antenna is reflected. Resonances in FIG. 7 (the troughs in the graph) indicate the frequencies at which the antenna radiates (and therefore also receives) best. The two large resonances in FIG. 7 indicate that the antenna is able to radiate at two different frequency bands, illustrating that the antenna has dual-band functionality. The band edges and peaks are represented by the markers on the graph. The antenna radiates best close to the L5 frequency band where $S_{11}\cong-16.2$ dB with a narrow bandwidth of ~20 MHz, and close to the L1 frequency band where $S_{11}\cong-20.75$ dB with a narrow bandwidth of ~16 MHz. Narrow bandwidths are expected for these resonant frequencies as a result of the compact antenna size. FIG. 7 indicates that the antenna radiates better at the higher resonant frequency (L1), compared with the lower resonant frequency (L5).

Figure 8:
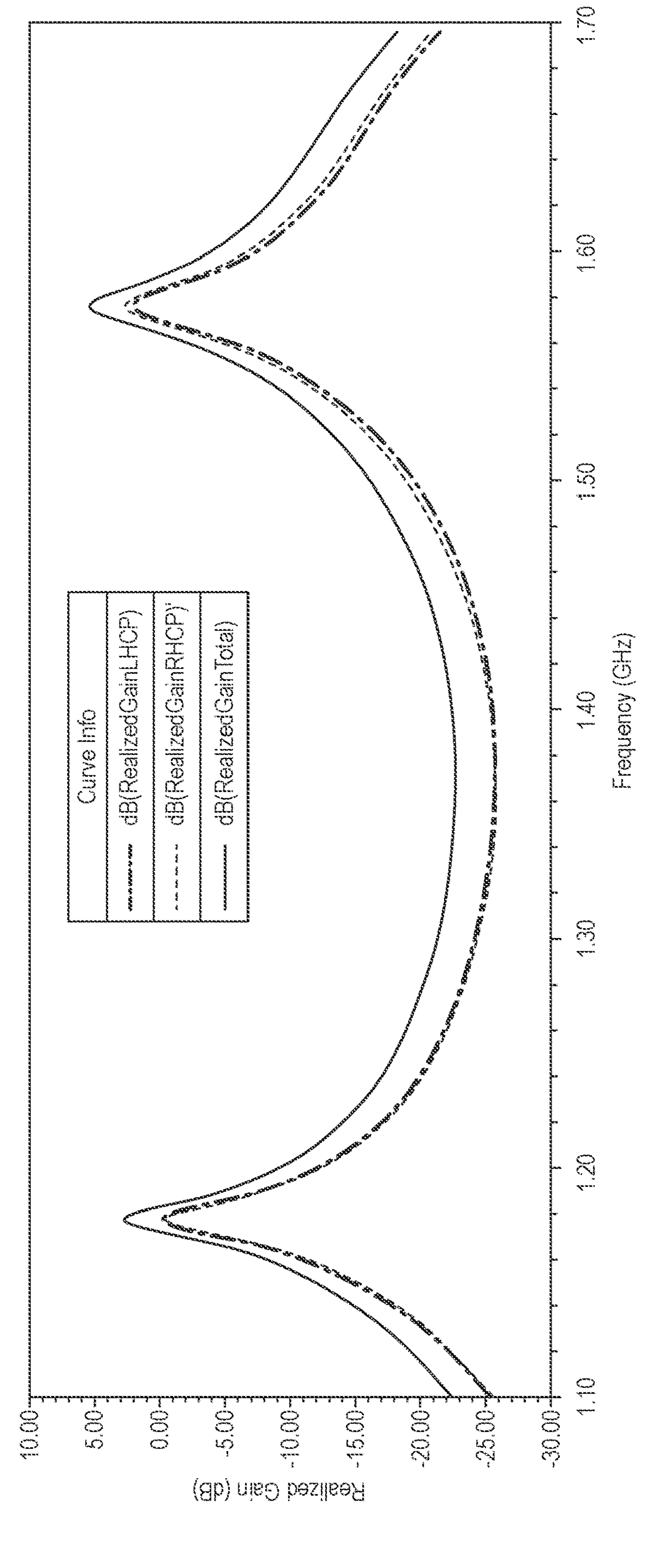
FIG. 8 is a graph illustrating the total realized gain of the antenna of FIG. 1, displaying both the RHCP and LHCP components.

FIG. 8 illustrates realized gain components at zenith, over a range of frequencies that encompass the L1 and L5 frequency bands. Shown in the figure are LHCP and RHCP components of the realized gain, as well as the total realized gain. Around the L5 frequency band, the LHCP and RHCP components are almost identical, which suggests linear polarization at L5. Around the L1 frequency band, the RHCP realized gain component is slightly larger than the LHCP realized gain component, which suggests slight elliptical polarization at L1. As the signals from the GPS satellites are RHCP, the antenna suffers from polarization losses. As the slight elliptical polarization is closest to an ideal circular polarization, the higher resonant frequency (L1) has a lower polarization loss than the lower resonant frequency (L5).

Figure 9:
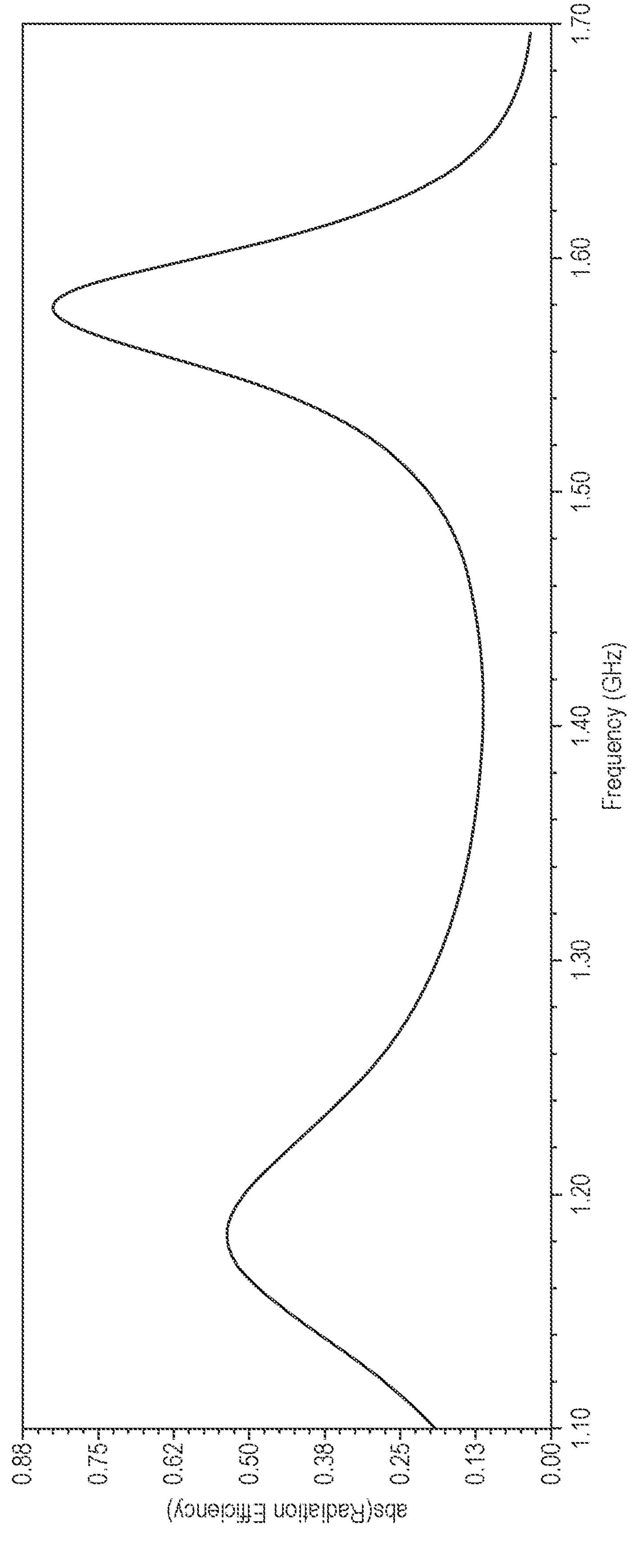
FIG. 9 is a graph that shows the efficiency of the antenna of FIG. 1 at a range of frequencies.

In part by analyzing return loss and polarization losses, the efficiency of the antenna is simulated in FIG. 9. The antenna is able to radiate at the L5 frequency at over 50% efficiency. Moreover, the antenna is able to radiate the L1 frequency at over 80% efficiency.

The first embodiment of the antenna has been described above with reference to a specific set of exemplary dimensions. These exemplary dimensions are not limiting. In Table 1, exemplary ranges of values are provided, to illustrate the possible variations relative to the exemplary values described. However, it should be understood that these exemplary ranges are also not limiting on the scope of the present disclosure.

TABLE 1

Exemplary antenna dimensions

| Parameter | Nominal Value | Range |
|---|---|---|
| Dielectric constant of substrate | 60 | 30-70 |
| Lsubstrate (mm) | 15 | 12-20 |
| Hsubstrate (mm) | 4 | 3-8 |
| Lfirstlayer (mm) | 15 | 12-20 |
| Dsecondlayer (mm) | 100 | >45 |
| Lpatch (mm) | 12.68 | 11-19 |
| Wpatch (mm) | 12.25 | 11-19 |
| dx (mm) | 0.25 | −1-+1 |
| dy (mm) | 0.27 | −1-+1 |
| Ltruncated (mm) | 1.5 | 0.5-2 |
| Lpatch − Ltruncated (mm) | 11.18 | 9-18.5 |
| dfeed (mm) | 0.5 | 0.25-3 |
| Wcap (mm) | 1.52 | 1-6 |
| Wstub (mm) | 1.59 | 1-5 |
| dstub (mm) | 3.6 | 0-19 |
| Lstub (mm) | 2.21 | 2-10 |

Figure 10:
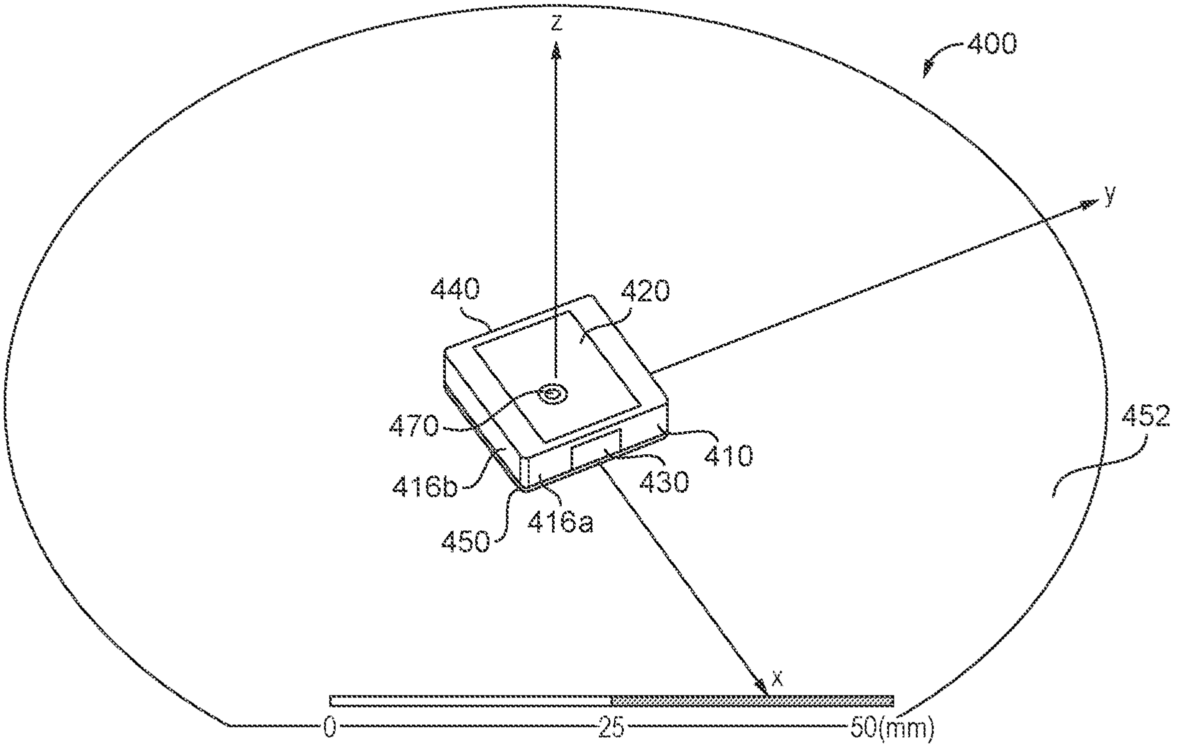
FIG. 10 is a diagram of an antenna according to a second example.

FIG. 10 shows a diagram of an antenna 400 according to another example. The antenna comprises: a substrate 410 formed of a dielectric material, a conductive patch 420, a first conductive strip 430 and a second conductive strip 440, a ground plane 450, 452, and a feed point 470. These components work similarly to the first embodiment.

The substrate of the antenna 400 has an upper surface, a lower surface, and four side surfaces that connect the upper surface with the lower surface. In FIG. 10, the four side surfaces are labelled as a first side surface 416*a*, a second side surface 416*b* perpendicular to the first side surface, a third side surface parallel to the first side surface, and a fourth side surface parallel to the second side surface. The substrate forms a right square prism, similar to the antenna 100. However, the edges and corners of the substrate are not rounded; instead, sharp right-angled corners connect the upper, lower, and side surfaces. The substrate of the antenna is made of a dielectric material with a higher dielectric constant ($\varepsilon_r \cong 70$) than in the first embodiment.

The conductive patch 420 is attached to the upper surface of the substrate. The conductive patch forms a rectangle, with no truncated edges. Furthermore, no concave features are illustrated in the figure, for simplicity. Hence, in FIG. 10, the conductive patch covers 100% of the area of its convex hull. If concave features are required to tune the antenna, the conductive patch may cover at least 95% of the area of its convex hull.

The lower surface of the substrate has a first conductive layer 450 formed on it, covering the entirety of the lower surface. The substrate is mounted to a PCB. An upper surface of the PCB has a second conductive layer 452 formed on it. Together, the first conductive layer 450 and the second conductive layer 452 form the ground plane. As shown in FIG. 10, the second conductive layer 452 of the ground plane is circular, and has surface dimensions much larger than the substrate. Both conductive layers forming the ground plane remain parallel to the conductive patch on the upper surface of the antenna.

The conductive patch 420 shown in FIG. 10 has a feed point 470 offset from the centre of the conductive patch and offset from the upper surface of the substrate. The feed is off-centre to excite two modes for the two frequency bands independently: the feed is offset along the longitudinal axis for L5, while the feed is offset along the transverse axis for L1.

The antenna also contains a first conductive strip 430 and a second 440 conductive strip, attached to the first side surface 416*a* and the third side surface of the substrate, respectively. Hence, the first and second conductive strip are attached to planes perpendicular to the conductive patch and the ground plane. The dimensions of the first and second conductive strips are identical, and so only the dimensions of the first conductive strip are described. Here, the first conductive strip consists only of one part: an elongate strip portion. The elongate strip portion is rectangular, so that the first and second conductive strips are also rectangular in shape. In this embodiment, the elongate strip portion has a lower edge in contact with the ground plane, while the upper edge has a non-zero distance to the longitudinal edge of the upper surface of the substrate. Therefore, instead of requiring a ground coupling portion (as in the embodiment of FIG. 1), the elongate strip portion of the first conductive strip is in direct contact with the ground plane. The first and second conductive strips are used in the same way as in the first embodiment, in order to lower the lower of two resonant frequencies of the antenna, in order to position the lower resonant frequency in the L5 band. The addition of the first and second conductive strips, in conjunction with the high dielectric constant of the substrate material, facilitates dual-band functionality whilst the antenna remains compact.

Figure 11:
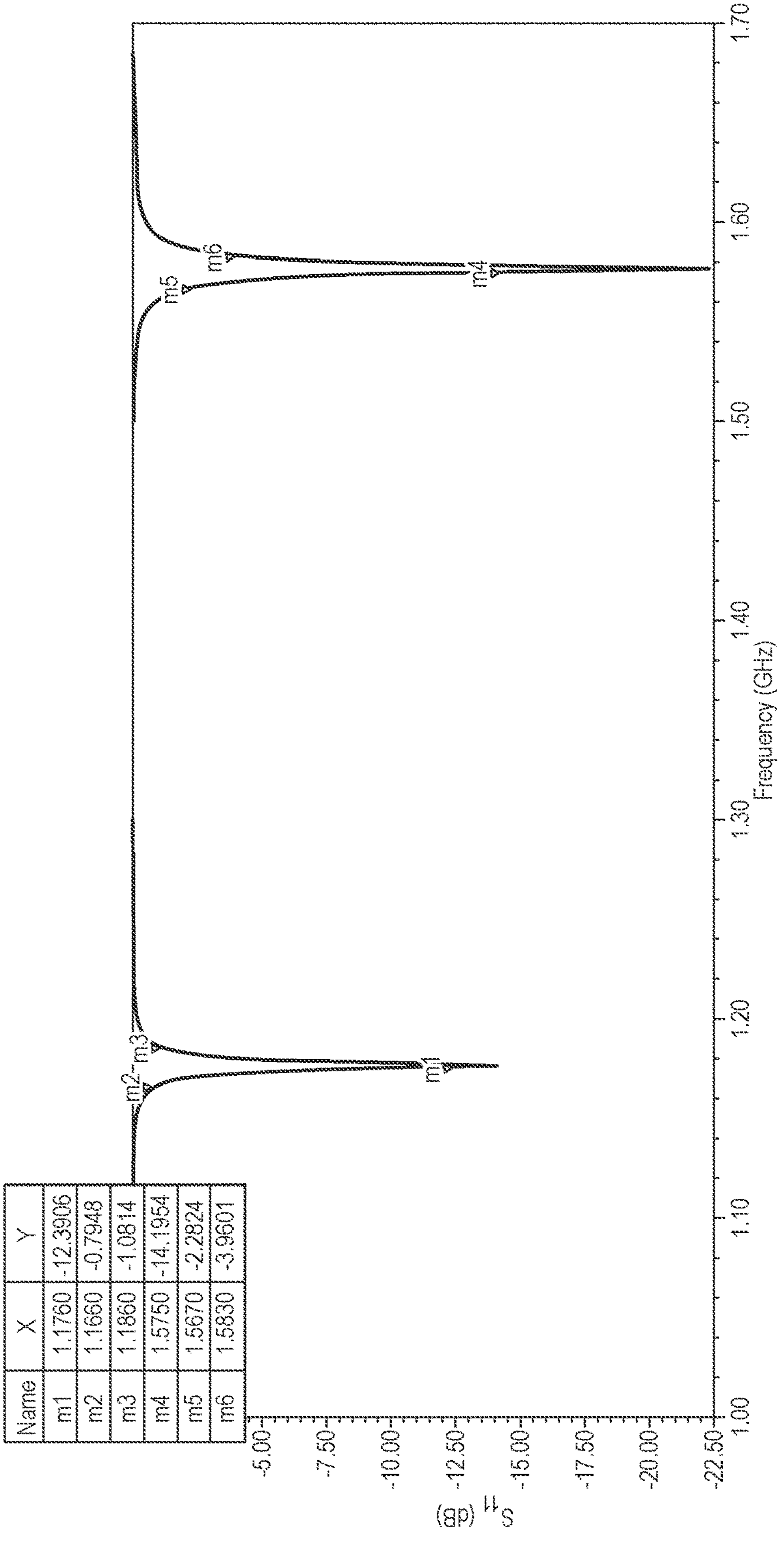
FIG. 11 is a graph illustrating the $S_{11}$ parameter values of the antenna of FIG. 10.

FIG. 11 shows the dual-band nature of this antenna, illustrating the behaviour of the S-parameter $S_{11}$ over a range of frequencies that encompasses the L1 and L5 frequency bands. Two resonances are present in the graph, illustrating that the antenna is able to radiate at two different frequency bands.

Figure 12:
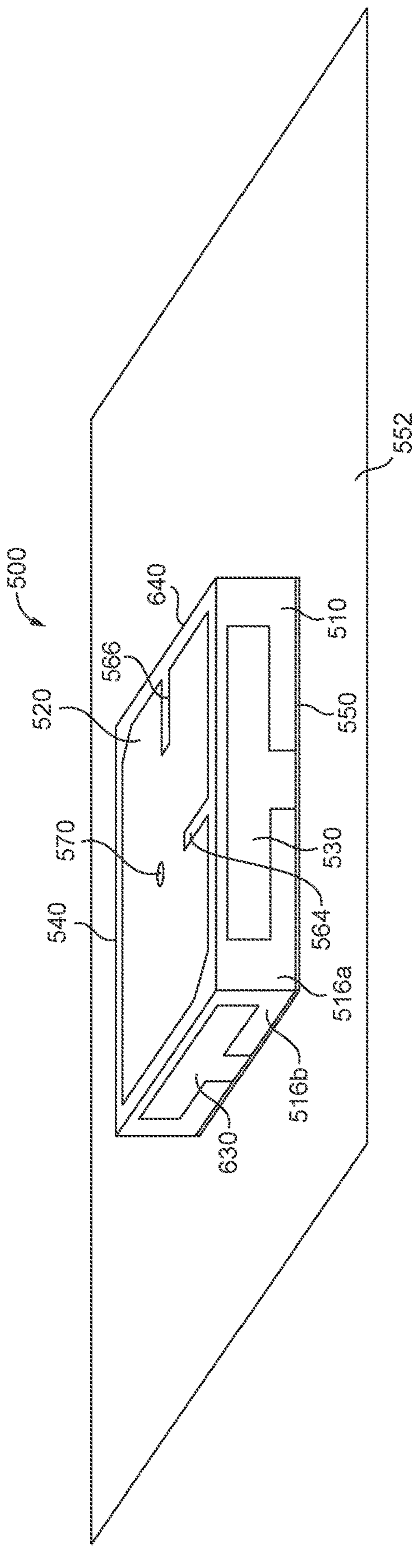
FIG. 12 is a diagram of an antenna according to a third example.

FIG. 12 shows a diagram of an antenna 500 according to another example. The antenna comprises: a substrate 510 formed of a dielectric material, a conductive patch 520, a first conductive strip 530 and a second conductive strip 540, a third conductive strip 630 and a fourth conductive strip 640, a ground plane 550, 552, and a feed point 570. These components work similarly to the first embodiment.

The antenna 500 has similar features to the antenna 100 described in the first embodiment. The antenna comprises a substrate of similar shape and dimensions, a conductive patch with an off-centre feed point and two concave features (a first slot 564 and a second slot 566), and asymmetric T-shaped first and second conductive strips. The substrate has four side surfaces, namely a first side surface 516*a*, a second side surface 516*b* perpendicular to the first side surface, a third side surface opposite and parallel to the first side surface, and a fourth side surface opposite and parallel to the second side surface. The upper edge of both the first and second conductive strips is coextensive with the respective adjacent longitudinal edge of the conductive patch.

In addition, the antenna comprises a further pair of conductive strips—namely, a third conductive strip 630 and a fourth conductive strip 640 that are attached to the second 516*b* and fourth side surfaces respectively, such that the first and second conductive strips alternate with the third and fourth conductive strips (proceeding around the antenna from one side surface to the next). The conductive strips are designed to provide capacitive loading on all four side surfaces of the antenna, lowering the resonant frequency of the antenna for the L1 band, as well as the L5 band. The addition of the third and fourth conductive strips may be advantageous if a substrate material is used that has a high dielectric constant, but the value of the constant is lower than the substrates used in the previous examples (in other words, when $\varepsilon_r \leq 60$). Thus, a similarly compact dual-band antenna may be designed without using a material that has such a high dielectric constant.

Similar to the antenna 400 of FIG. 10, the antenna 500 of FIG. 12 has a ground plane 550 with overall length and width dimensions that are larger than the width and length dimensions of the lower surface of the substrate. Once again, a first conductive layer 550 is formed on the lower surface of the substrate 510, covering the entire lower surface. When the antenna is installed for use, the substrate 510 is mounted on a PCB (not shown). A second conductive layer 552 is formed in or on the PCB. When the substrate is mounted on the PCB, the second conductive layer is galvanically connected to the first conductive layer. Together, the first conductive layer 550 and the second conductive layer 552 form the ground plane. In this embodiment, the centre (centroid) of the lower surface of the substrate is directly above the centre (centroid) of the ground plane. However, the second conductive layer 552 of the ground plane is square-shaped (in contrast with the circular-shape of the second conductive layer of the ground planes according to the previous examples), with a side length of 45 mm.

In some other embodiments, the shape of the substrate is not limited to a right square prism. The substrate may be in the shape of a right rectangular prism (a square being a special case of a rectangle) such that the length of the upper surface and the lower surface of the substrate is not constrained to be equal to the width of the upper surface and the lower surface of the substrate. Note however that the substrate does not have to be constrained to the form of a right rectangular prism; the substrate may take another prism-shape or may be cylindrical, for example. More specifically, the substrate may comprise a regular polygon-faced prism, or may comprise a right cylinder, for example a right circular cylinder. If the substrate has the shape of a right cylinder, the conductive strips are all attached to a single continuous side surface. A first conductive strip may be located 180° opposite a second conductive strip, while a third conductive strip may be located 180° opposite a fourth conductive strip. For a configuration in which the antenna has four conductive strips, the first and second conductive strips may alternate with the third and fourth conductive strips (proceeding around the cylinder in an azimuthal rotation).

It is further noted that the substrate is not limited to a shape in which the upper and lower surfaces are the same shape or have the same dimensions. For example, the substrate could be the shape of a truncated square pyramid, wherein the upper surface and the lower surface are both square, but the lower surface is larger than the upper surface of the substrate (the lower surface and upper surface being connected by four trapezoidal side surfaces).

In some embodiments, the one or more side surfaces may be substantially perpendicular to the upper surface and lower surfaces. Here, "substantially perpendicular" refers to an angle between the upper surface and the side surface in the range 80° to 100°. Alternatively, the side surfaces might not be perpendicular or substantially perpendicular to the upper and lower surface of the substrate.

Furthermore, the substrate is not limited as to the number of side surfaces. The substrate may have one single continuous side surface (for a cylindrical substrate), or may have more than one side surface. Any surface of the substrate that is not the upper or lower surface may be considered a side surface of the substrate. Surfaces that are formed as a result of chamfered edges may be classed as portions of side surfaces. For a substrate in the shape of a right square prism with chamfered edges, the major portion of each side surface may be perpendicular to the upper and lower surfaces, and the side surfaces may further comprise smaller side surface portions that arise from the chamfered edges.

The second conductive layer is not limited to the circular shape illustrated in FIG. 1 and FIG. 10, nor is it limited to the square shape illustrated in FIG. 12. The second conductive layer of the ground plane may be polygonal, optionally rectangular. Moreover, the centre (centroid) of the lower surface of the substrate might not be directly above the centre (centroid) of the second conductive layer; the substrate may be placed off-centre on the second conductive layer. This may lead to a slight shift in the excited resonant frequencies, and may lead to asymmetry in the radiation pattern.

The convex hull of the conductive patch is not limited to a rectangular shape, with or without two truncated edges at diagonally-opposing corners. The convex hull may be a rectangle that has at least one of the corners truncated. The convex hull may be a rectangle that has all four of its corners truncated. The truncated edges may result in an interior angle of 135° between the truncated edge and a longitudinal or transverse edge of the conductive patch. The truncation of the rectangular conductive patch may result in other interior angles. In any of these cases, the convex hull may be a rectangle that has sides of equal length (that is, a square), or sides of unequal length. Moreover, the convex hull may be a different shape to a rectangle; for example, the convex hull may be a circle, an ellipse, or any other non-limiting convex 2D shape.

The first and second conductive strips may be rectangular, such that they each consist only of a single rectangular elongate strip portion with a lower edge in contact with the ground plane. When the conductive strips include a ground coupling portion, each conductive strip may have a symmetrical T-shape. Each conductive strip may comprise an elongate strip portion and a ground coupling portion, with both of these portions being rectangular. The ground coupling portion has a lower edge in contact with the ground plane, and has a length shorter than the length of the elongate strip portion. To form the symmetrical T-shape, the centre (centroid) of the elongate strip portion is aligned horizontally above the centre (centroid) of the ground coupling portion. In other cases (as described for the first embodiment above), the first and second conductive strips may each have an asymmetrical T-shape, such that the ground coupling portion is offset horizontally from the centre of the elongate strip portion. In a more extreme case of this asymmetry, each conductive strip may form an inverse L-shape, wherein one right or left vertical edge of the ground coupling portion is an extension of the respective vertical edge of the elongate strip portion.

The dielectric material of the substrate may have a dielectric constant in the range 30 to 70, optionally 50 to 70, optionally 55 to 65. The substrate may consist of any suitable dielectric material that has such a dielectric constant value; for example, the substrate may comprise or consist of a ceramic material.

The antenna may be a dual-band antenna, which is configured to receive signals from GPS satellites, and which has two resonant frequencies—one in the L5 band and another in the L1 band—as described above for the first embodiment. Alternatively, the dual-band antenna may be configured to receive signals from Galileo satellites, with a resonant frequency in each of the E5a band and the E1 band. As a further alternative, the dual-band antenna may be configured to receive signals from BDS satellites, with a resonant frequency in each of the B2a band and the B1C band. The GNSS receiver 310 may be configured to receive signals from any of the frequency bands above.

In the first embodiment, the antenna feed point 170 was provided by a metal-lined through-hole in the substrate. However, in other embodiments, the feed point may be provided in other ways. For example, the feed point may be provided by a pin extending through the substrate from the conductive patch.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The embodiments may be implemented by means of hardware comprising several distinct elements. In a device claim enumerating several means, several of these means may be embodied by one and the same item of hardware. The mere fact that certain measures are recited in mutually different dependent claims does not indicate that a combination of these measures cannot be used to advantage. Furthermore, in the appended claims lists comprising "at least one of: A; B; and C" should be interpreted as (A and/or B) and/or C.

The invention claimed is:

1. An antenna comprising:

a substrate composed of a dielectric material, the substrate having an upper surface, a lower surface, and side surfaces connecting the upper surface with the lower surface;

a conductive patch on the upper surface of the substrate;

a first conductive strip on a first one of the side surfaces, the first conductive strip comprising an elongate strip portion and a ground coupling portion, the elongate strip portion not extending to the upper surface; and a second conductive strip on a second one of the side surfaces, the second conductive strip comprising an elongate strip portion and a ground coupling portion, the elongate strip portion not extending to the upper surface, wherein the first and second conductive strips are arranged at opposing sides of the conductive patch, the antenna further comprising a ground plane, wherein the first and second conductive strips are galvanically isolated from the conductive patch and galvanically connected to the ground plane.

2. The antenna of claim 1, wherein the ground plane comprises a conductive layer on the lower surface of the substrate.

3. The antenna of claim 1, wherein each of the side surfaces has at least a portion that is substantially perpendicular to the upper surface.

4. The antenna of claim 1, wherein the upper and lower surfaces are square, and the side surfaces comprise four side surfaces.

5. The antenna of claim 1, further comprising:

a third conductive strip on a third one of the side surfaces; and a fourth conductive strip on a fourth one of the side surfaces, wherein the third and fourth conductive strips are arranged at opposing sides of the conductive patch.

6. The antenna of claim 5, wherein the conductive strips are arranged around the side surfaces such that the first and second conductive strips alternate, respectively, with the third and fourth conductive strips.

7. The antenna of claim 1, wherein each of the conductive strips comprises an elongate strip portion having a longitudinal axis that is parallel to the upper surface of the substrate.

8. The antenna of claim 7, wherein the elongate strip portion is arranged closer to the upper surface than to the lower surface of the substrate.

9. The antenna of claim 7, wherein each conductive strip further comprises a ground coupling portion below the elongate strip portion, arranged to galvanically connect the elongate strip portion to the ground plane.

10. The antenna of claim 9, wherein the ground coupling portion is offset horizontally from a center of the elongate strip portion.

11. The antenna of claim 1, wherein the conductive patch is shaped such that its convex hull describes one of:

a circle;

an ellipse;

a rectangle;

a rectangle having four corners, wherein at least one of the corners is truncated;

a rectangle having four corners, wherein two diagonally opposing corners are truncated;

or a rectangle having four corners, wherein all four corners are truncated.

12. The antenna of claim 11 having a rectangular convex hull shaped conductive patch, wherein the conductive patch includes one or more concave features present along one or more edges of the convex hull, the one or more concave features including:

a stepped indentation in a transverse edge of the conductive patch, the stepped indentation comprising a step of up to 1 mm in the transverse edge;

a first slot in a longitudinal edge of the conductive patch, the first slot having a length of up to 2 mm and a width in the range 0.1 to 0.5 mm; or a second slot in a transverse edge of the conductive patch, the second slot having a length of up to 3 mm and a width in the range 0.1 to 0.5 mm.

13. The antenna of claim 1, wherein the conductive patch has a feed point, and wherein the feed point is offset from a center of the conductive patch and/or the feed point is offset from a center of the upper surface of the substrate.

14. The antenna of claim 1, wherein:

the substrate comprises a right rectangular prism defining a polyhedron with a rectangular base and a second base which is a translated copy of the first base without rotation and the joining edges and faces are perpendicular to the base faces;

the upper and lower surfaces of the substrate are square;

the conductive patch is shaped such that its convex hull describes a rectangle having four corners, wherein two diagonally opposing corners are truncated;

the first conductive strip has an upper edge parallel to the upper surface of the prism; and the conductive patch has a longitudinal edge parallel to the first conductive strip.

15. A global navigation satellite system (GNSS) receiver module, comprising:

the antenna of claim 1; and a GNSS receiver, coupled to the antenna.

* * * * *